United States Patent
Van Wageningen

(10) Patent No.: US 11,165,285 B2
(45) Date of Patent: Nov. 2, 2021

(54) POWER TRANSMITTER AND POWER RECEIVER FOR AN INDUCTIVE POWER SYSTEM

(71) Applicant: KONINKLIJKE PHILIPS N.V., Eindhoven (NL)

(72) Inventor: Andries Van Wageningen, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 202 days.

(21) Appl. No.: 16/389,145

(22) Filed: Apr. 19, 2019

(65) Prior Publication Data

US 2019/0245392 A1    Aug. 8, 2019

Related U.S. Application Data

(63) Continuation of application No. 13/878,589, filed as application No. PCT/IB2011/054342 on Oct. 4, 2011, now Pat. No. 10,320,244.

(30) Foreign Application Priority Data

Oct. 13, 2010   (EP) .................................... 10187379

(51) Int. Cl.
*H02J 50/80* (2016.01)
*H02J 50/10* (2016.01)
(Continued)

(52) U.S. Cl.
CPC .............. *H02J 50/80* (2016.02); *H02J 7/025* (2013.01); *H02J 50/10* (2016.02); *H04B 5/0031* (2013.01); *H04B 5/0037* (2013.01)

(58) Field of Classification Search
CPC ......... H02J 50/10; H02J 50/80; H04W 72/00; H04W 4/00; H04W 76/00; H04W 88/00
See application file for complete search history.

(56) References Cited

U.S. PATENT DOCUMENTS 7,378,817 B2   5/2008   Calhoon
7,633,235 B2  12/2009   Boys
(Continued)

FOREIGN PATENT DOCUMENTS

EP   1845694 A1   10/2007
EP   2328223 A1    6/2011
(Continued)

OTHER PUBLICATIONS

Dries Van Wageningen et al: "The Qi Wireless Power Standard", Power Electronics and Motion Control Conference (EPE/PEMC), 2010 14th International, IEEE, Piscataway, NJ, USA, Sep. 6, 2010 (Sep. 6, 2010), pp. S15-S25, XP031778417.

*Primary Examiner* — Hal Kaplan
*Assistant Examiner* — Joseph N Inge

(57) ABSTRACT

A wireless inductive power transfer system comprises a power transmitter for transmitting power inductively to a power receiver via transmitter coil 11 to receiver coil 21. In the system, a communication method comprises a step 37 of transmitting, by the power receiver, first data and second data to the power transmitter, the first data indicating a modulation requirement, and the second data indicating an inquiry message; a step 32 for receiving, by the power transmitter, the first data and the second data from the power receiver; a step 34 for transmitting, by the power transmitter, a response message for responding to said inquiry message, by modulating a power signal according to said modulation requirement so as to carry the response message; and a step 35 for receiving the response message by the power receiver by demodulating the modulated power signal carrying the response message received via the receiver coil from the power transmitter.

12 Claims, 2 Drawing Sheets

Figure 1:
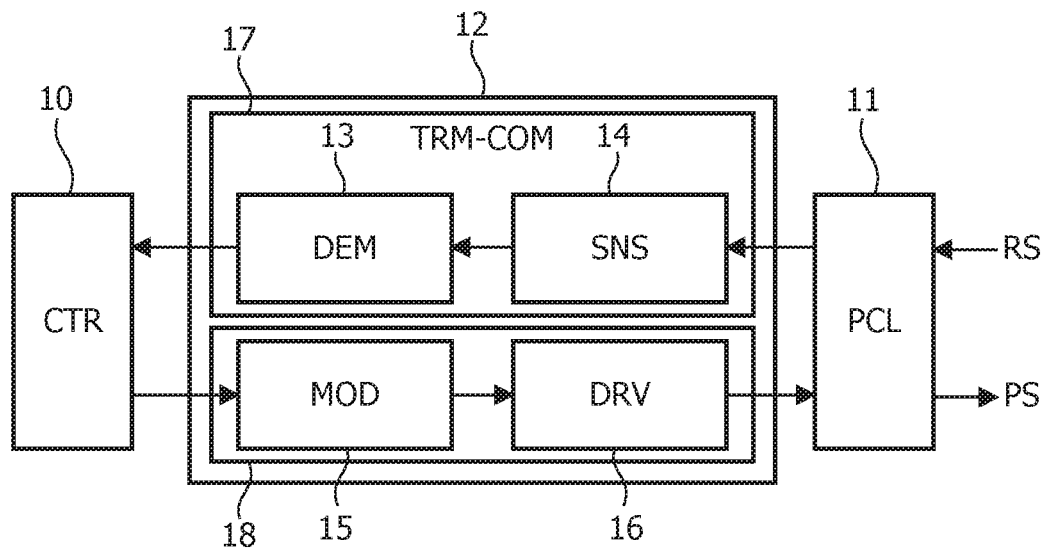

(51) Int. Cl.
  *H02J 7/02*   (2016.01)
  *H04B 5/00*   (2006.01)

(56)  References Cited

U.S. PATENT DOCUMENTS

| | | | |
|---|---|---|---|
| 9,190,858 | B2 | 11/2015 | Baarman |
| 2007/0021140 | A1 | 1/2007 | Keyes |
| 2009/0108805 | A1 | 4/2009 | Liu |
| 2009/0239524 | A1 | 9/2009 | Terabe |
| 2009/0243799 | A1 | 10/2009 | Tetlow |
| 2009/0251008 | A1* | 10/2009 | Sugaya ............... H02J 50/90 307/104 |
| 2009/0322281 | A1 | 12/2009 | Kamijo |
| 2010/0013322 | A1 | 1/2010 | Sobage |
| 2010/0072825 | A1 | 3/2010 | Azancot |
| 2010/0083012 | A1* | 4/2010 | Corbridge ............ G06F 1/26 713/300 |
| 2010/0176659 | A1 | 7/2010 | Aoyama |
| 2010/0244576 | A1* | 9/2010 | Hillan ............... G06K 19/0707 307/104 |

FOREIGN PATENT DOCUMENTS

| | | |
|---|---|---|
| JP | 2010080736 A | 4/2010 |
| JP | 2010104098 A | 5/2010 |
| WO | WO2008017818 A1 | 2/2008 |
| WO | WO2010111541 A2 | 9/2010 |

* cited by examiner

POWER TRANSMITTER AND POWER RECEIVER FOR AN INDUCTIVE POWER SYSTEM

The invention relates to a power transmitter for transmitting power inductively to a power receiver via a transmitter coil, and to a power receiver for receiving power inductively from a power transmitter via a receiver coil.

The invention further relates to a method of communicating in an inductive power transfer system, the system comprising a power receiver and a power transmitter, the power receiver comprising a receiver coil, the power transmitter comprising a transmitter coil.

The invention relates to the field of power transfer technology using an inductive wireless power transfer system. Such systems may have one or more power transmitters that transmit power inductively via one or more transmitter coil(s) to one or more power receivers that are powered by power received via the receiver coil. The transmitter coil(s) and receiver coil are in close proximity to each other.

To charge the batteries of battery-fed devices, such as cellular phones, PDAs, remote controls, notebooks etc., or directly power devices such as lamps or kitchen appliances, an inductive power system enabling a wireless power transfer can be applied. Inductive power systems for transferring power or charging mobile devices are generally known. Such a system comprises a power transmitting device, hereafter called power transmitter, comprising a transmitter coil which can be energized, thereby generating an alternating magnetic field. The inductive power system further comprises a power receiving device, hereafter called power receiver, connectable to, or part of, a device that is to be charged or provided with power. In order to receive the power, the power receiving device is provided with a receiver coil, in which the alternating magnetic field, provided by the energized transmitter coils, induces a current. This current can drive a load or, for example, charge a battery, power a display or light a lamp.

Document US 2009/0108805 describes an inductive battery charging system designed to enable electronic devices to be recharged. The system includes a planar power surface on which a device to be recharged is placed. Within the power surface there is at least one transmitter coil and optionally an array of transmitter coils coupling energy inductively to a receiver coil formed in the device to be recharged. The field of application of such an array may be a general power surface for powering wireless devices, e.g. for charging batteries, integrated in furniture, or as floor or wall covering. The document describes communication from the power receiver to the power transmitter and vice versa. Data transfer from the secondary side (power receiver) to the primary side (power transmitter) may be achieved by modulating a parameter (such as, for example, the loading conditions) on the secondary side. Data transfer from the primary side to the secondary side may be achieved by modulating the excitation of a primary winding, i.e. of the transmitter coil. Data communication may comprise handshaking and compatibility checks between the primary side and a load to be charged and/or determination of the charging status of a battery.

The known wireless inductive power system has the disadvantage that the data communication requires a specific arrangement of the power receiver, which enables the power receiver to communicate with, in particular receive data from, the power transmitter.

It is an object of the invention to provide a system, which allows a less complex power receiver to be used in the system.

For this purpose, according to a first aspect of the invention, the power transmitter as described in the opening paragraph comprises:
a first unit for obtaining first data and second data from the power receiver, said first data indicating a modulation requirement, and said second data indicating an inquiry message;
a second unit for transmitting a response message to the power receiver via the transmitter coil, the response message being intended for responding to said inquiry message;
said second unit comprising:
a modulator for modulating a power signal according to said modulation requirement for transmitting the response message.

For this purpose, according to a further aspect of the invention, the power receiver as described in the opening paragraph comprises:
a first unit for transmitting first data and second data to the power transmitter, the first data indicating a modulation requirement, and the second data indicating an inquiry message;
a second unit for receiving a response message from the power transmitter via the receiver coil, the response message being intended for responding to the inquiry message; said second unit comprising:
a demodulator for demodulating a power signal received by the receiver coil according to the modulation requirement for receiving the response message.

For this purpose, according to a further aspect of the invention, a method as described in the opening paragraph comprises the steps of:
receiving, by said power transmitter, first data and second data from the power receiver, said first data indicating a modulation requirement, and said second data indicating an inquiry message;
transmitting a response message to the power receiver via the transmitter coil, by modulating a power signal according to the modulation requirement, the response message being intended for responding to the inquiry message.

For this purpose, according to a further aspect of the invention, a method as described in the opening paragraph comprises the steps of:
transmitting, by the power receiver, first data and second data to the power transmitter, the first data indicating a modulation requirement, and the second data indicating an inquiry message;
receiving a response message from the transmitter via the receiver coil, by demodulating a power signal received by the receiver coil according to the modulation requirement, the response message being intended for responding to the inquiry message.

The measures have the effect that the first data indicates a modulation requirement that has to be used by the power transmitter when responding to the power receiver. Furthermore, the second data indicates an inquiry message to which the power transmitter has to respond. In the power transmitter, the second unit is for providing a response message modulated on a power signal according to said modulation requirement. Further, said response message is intended for responding to said inquiry message. Advantageously, the modulation of the power signal is adjusted according to the requirements as defined by the power receiver in the first data, which enables the power receiver to indicate its capabilities for detecting said modulation. Hence, in the system, different types of power receivers may indicate different modulation requirements. A power receiver may also indicate different modulation requirements, e.g. depending on its actual operation condition. Furthermore, by indicating an inquiry message via the second data, the power receiver is enabled to request a specific response from the power transmitter.

The invention is also based on the following recognition. In prior-art inductive power systems, various types of communication have been proposed. However, the type of modulation in a particular system will be defined during the design of the system. The inventors have found that, although a particular communication mode may be sufficient for some power receivers and power transmitters, other requirements may arise later or in different circumstances, so that a more complex communication, or a reduced type of communication, may be preferred. Moreover, for less demanding applications the cost of the power receiver may be optimized by setting a specific modulation type that is easily detected by the available resources of the power receiver. Hence, sending data on the modulation requirements and type of response via the first and second data transferred from the power receiver to the power transmitter enables setting the communication mode to be used by the power transmitter for transferring the response.

In an embodiment of the power transmitter, said modulation requirement is indicative of the demodulation capability of the power receiver. In an embodiment of the power receiver, said modulation requirement is indicative of the demodulation capability of the power receiver. This has the advantage that exchanging data on the modulation requirements via the first data transferred from the power receiver to the power transmitter enables setting the communication according to the capabilities of the power receiver.

In an embodiment of the power transmitter, said second data further indicates at least one of the following:
a format of said response message,
a time requirement for transmitting said response message, and the power transmitter being arranged to transmit said response message according to at least one of the format and the time requirement.

In an embodiment of the power receiver, said second data further indicates at least one of the following:
a format of said response message,
a time requirement for transmitting said response message;
and the power transmitter being arranged to transmit said response message according to the format and/or time requirement.

The format of the response message and the time requirement are defined via the second data. This has the advantage that various parameters of the response are set according to the capabilities of the power receiver.

In an embodiment of the power transmitter, the modulation requirement corresponds to at least one of the following:
a type of modulation of the power signal,
a modulation range for a certain type of modulation.

The type of modulation of the power signal is selected from the following:
amplitude modulation;
frequency modulation;
phase modulation;
The modulation range is selected from the following:
a modulation depth for amplitude modulation of the power signal,
a frequency shift for frequency modulation of the power signal,
a phase shift for phase modulation of the power signal.

In an embodiment of the power receiver the modulation requirement corresponds to at least one of the following:
a type of modulation of the power signal, a modulation range for a certain type of modulation.

The type of modulation of the power signal is selected from the following:
amplitude modulation;
frequency modulation;
phase modulation;
The modulation range is selected from the following:
a modulation depth for amplitude modulation of the power signal,
a frequency shift for frequency modulation of the power signal,
a phase shift for phase modulation of the power signal This has the advantage that, in practice, at least one of the parameters of the power signal modulation can be specified.

Further preferred embodiments of the devices and methods according to the invention are given in the appended claims, disclosure of which is incorporated herein by reference.

Figure 2:
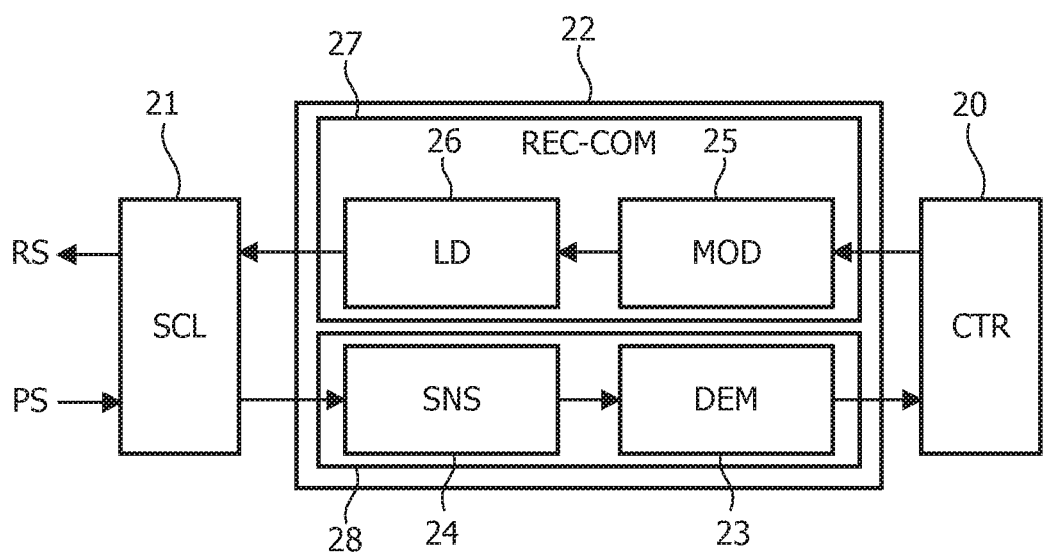
Figure 3:
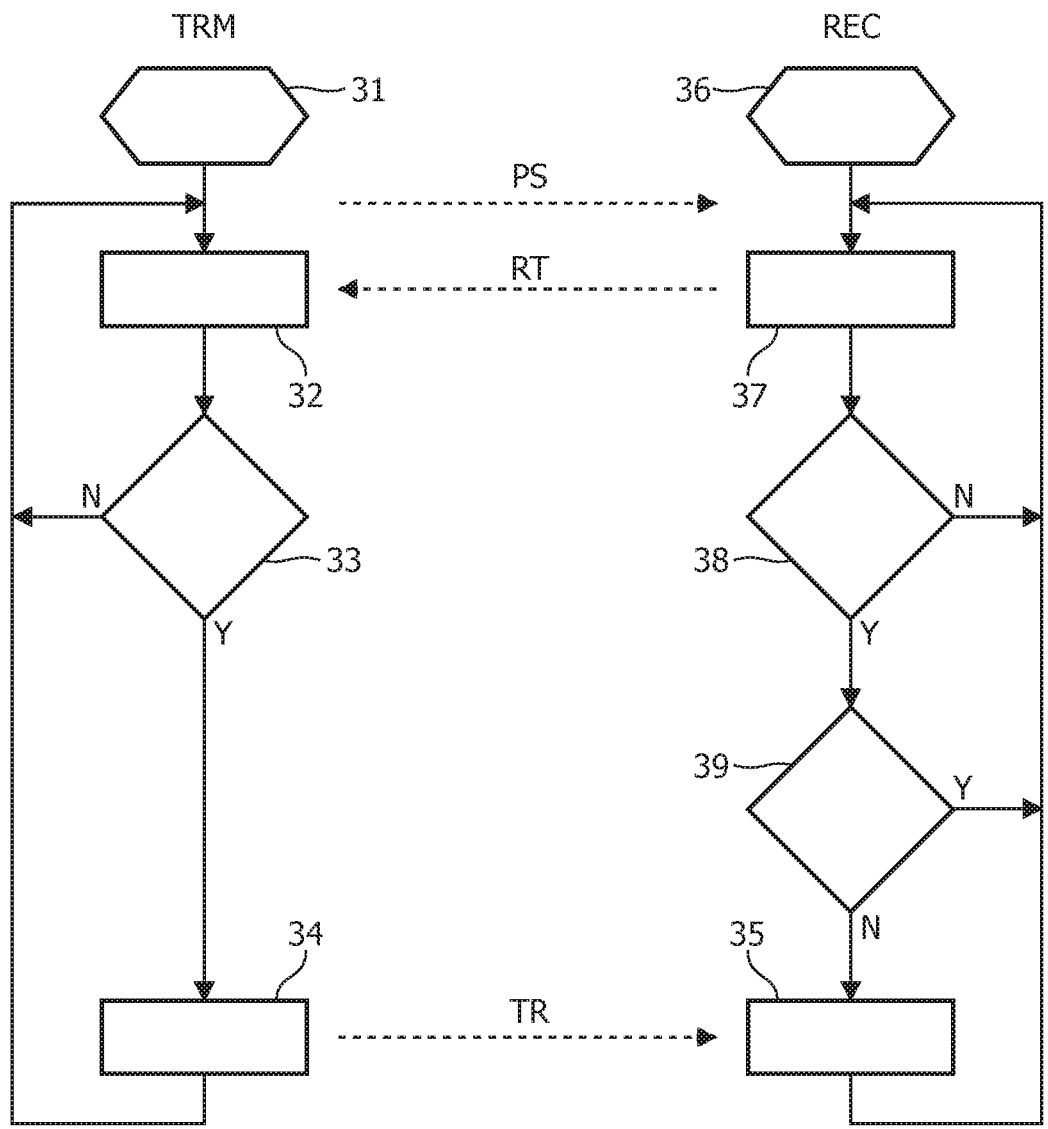
Figure 4:
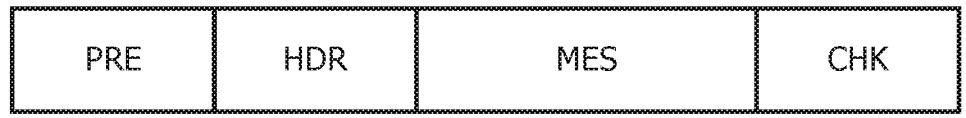

These and other aspects of the invention will be apparent from and elucidated further with reference to the embodiments described by way of example in the following description and with reference to the accompanying drawings, in which FIG. 1 shows a power transmitter,
FIG. 2 shows a power receiver,
FIG. 3 shows a flowchart for the communication in an inductive power system, and
FIG. 4 shows a data message.

The Figures are purely diagrammatic and not drawn to scale. In the Figures, elements which correspond to elements already described have the same reference numerals.

To prepare and control the power transfer between a power transmitter and a power receiver in a wireless power transfer system, the power receiver communicates information to the power transmitter.

On physical level, the communication channel from power receiver to power transmitter applies the power signal as carrier. The power receiver modulates a load which is detected by a change in the amplitude and/or phase of primary coil current, or a change in the voltage of the power transmitter. Based on this principle, the power receiver can modulate data which the power transmitter demodulates. This data is formatted in bytes and packets. More information can be found in the "System description, Wireless Power Transfer, Volume I: Low Power, Part 1: Interface Definition, Version 1.0 July 2010, published by the Wireless Power Consortium" available via http://www.wirelesspowerconsortium.com/downloads/wireless-power-specification-part-1.html, also called the Qi wireless power specification, in particular chapter 6: Communications Interface.

To control the power transfer, the system may proceed via different phases, in particular a ping phase and a configuration phase, and the Power transfer phase, described below. More information can be found in chapter 5 of part 1 of the Qi wireless power specification. Initially, the power transmitter provides the power signal and enters a selection phase. The power receiver can apply the received signal to power up its electronics. In this phase, the power transmitter typically monitors the interface surface for the placement and removal of objects. The power transmitter may use a variety of methods for this purpose, e.g. as described in the Qi wireless power specification.

In the Ping phase it is determined whether a power receiver is present at the interface of the power transmitter. After receiving the power signal, the power receiver communicates an initial packet to the power transmitter. Such a packet is the signal strength packet indicating the degree of coupling between power transmitter and power receiver. More information can be found in chapter 6.3.1 of part 1 of the Qi wireless power specification.

In the Configuration phase, in preparation of the actual power transfer, e.g. for charging a battery, the power receiver will keep its output load disconnected. The power receiver communicates its parameters to the power transmitter, whereupon configuration of the power transmitter takes place. The power transmitter provides a power signal of constant amplitude, frequency and phase for this purpose (with the exception of the change caused by load-modulation).

In the Power transfer phase, the actual power transfer takes place. After having communicated its power requirement, the power receiver will connect the output load to supply it with the received power. The power receiver monitors the output load and measures the control error between the actual value and the desired value of a certain operating point. It communicates such control errors to the power transmitter at a minimum rate of e.g. every 250 ms to indicate these errors to the power transmitter as well as the desire for a change, or no change, of the power signal. In case the actual value of the operating point equals the desired value, the power receiver communicates a control error with the value zero, meaning that the power signal should not change. In case the power receiver communicates a control error not equal to zero, it expects the power transmitter to change the power signal accordingly.

It is noted that the Qi wireless power specification defines communication from the power receiver to the power transmitter. Below, a system is described that enables communication in both directions, in particular also from the power transmitter to the power receiver. Various applications may benefit from such communication, for example: setting a power receiver in test mode, setting a power receiver in calibration mode, or allowing communication from power transmitter to power receiver under the control of the power receiver, e.g. for communicating a command, or status information from power transmitter to power receiver.

FIG. 1 shows a power transmitter. A transmitter coil 11, also called primary coil (PCL), is shown connected to a power transmitter communication unit 12 (TRM-COM), which is coupled to a controller 10 (CTR). The power transmitter communication unit 12 has a modulator 15 (MOD), coupled to a driver 16 (DRV) for driving the transmitter coil for transmitting a modulated power signal (PS) via the transmitter coil to a receiver coil. The power receiver may affect the power signal or send a power receiver signal to the power transmitter via the secondary and primary coils, which signal is called a reflected signal (RS). The reflected signal is detected by a sense unit 14 (SNS), e.g. by sensing the current or voltage on the transmitter coil. A demodulator 13 (DEM) is coupled to the controller 10 for demodulating the detected signal, e.g. by converting changes in the amplitude or phase of the detected signal into bits.

In an embodiment of the invention, a first unit 17 is arranged for receiving first data and second data from the power receiver via the transmitter coil 11. The first unit 17 comprises the sense unit 14, and the demodulator 13. These two units implement the function of receiving the first data and the second data via the transmitter coil. The primary coil 11 transmits an alternating magnetic field (the power signal PS) for inductive power transfer to a secondary coil and receives the reflected magnetic field (reflected signal RS) caused by the secondary coil. The sense unit 14 (current/voltage sensor SNS) senses the current/voltage on the primary coil. The demodulator 13 translates changes of amplitude or phase of the sensed signal into data, e.g. said first and second data. The obtained first data indicates a modulation requirement, and the second data indicates an inquiry message.

The controller interprets the received data, and then a second unit 18 is arranged for transmitting a response message to the power receiver via the transmitter coil, the response message being intended for responding to said inquiry message. The controller provides a response message to the modulator, the response message being intended for responding to said inquiry message, and the controller controls the modulator in accordance with the interpreted data as described in detail below. The modulator 15, comprised by the second unit, is arranged for modulating a power signal according to said modulation requirement so as to carry the response message. The modulator 15 modulates the power signal by changing the amplitude, frequency, or phase of the power signal. The driver 16, also comprised by the second unit, is arranged for transmitting the modulated power signal via the transmitter coil to the power receiver by supplying an alternating electric signal to the transmitter coil.

FIG. 2 shows a power receiver. The power receiver comprises a first unit 27 for sending first data and second data to the power transmitter via the receiver coil to a transmitter coil, the first data indicating a modulation requirement, the second data indicating an inquiry message. A receiver coil 21, also called secondary coil (SCL) is shown connected to a power receiver communication unit 22 (REC-COM), which is coupled to a controller 20 (CTR). The power receiver communication unit has a changeable load (LD) 26 coupled to a modulator 25 (MOD) for modulating the load at the receiver coil for generating said reflected signal (RS) for transmitting first data and second data to the power transmitter, the first data indicating a modulation requirement, the second data indicating an inquiry message. From the above description, it can be understood that the first unit 27 is a function unit; it comprises the modulator 25 and the changeable load 26. By virtue of the cooperation of these two units, the function of sending the first data and the second data from the power receiver to the power transmitter via the receiver coil can be implemented.

The power receiver comprises a second unit 28 for receiving a response message from the power transmitter via the receiver coil, the response message being intended for responding to the inquiry message. For this purpose, the second unit 28 comprises a sense unit 24 (SNS) for detecting a modulated power signal (PS) received via the receiver coil from the power transmitter, e.g. by sensing a voltage or current. The second unit further comprises a demodulator 23 (DEM), which is coupled to the controller 20, for demodulating the detected signal according to the modulation requirement for obtaining the response message, e.g. by converting changes in the amplitude or phase of the detected signal into bits.

In an embodiment, the secondary coil 21 receives the power signal for inductive power transfer from a primary coil and transmits a reflected signal to the primary coil. The load 26 determines the reflected signal. The modulator 25 changes the amplitude or phase of the reflected signal, e.g. by connecting/disconnecting an impedance circuit. The current/voltage sense unit 24 senses the current/voltage on the secondary coil as received from the transmitter. The sense unit 24 may be part of another function of the power receiver. It may include a rectifier. It may also sense the voltage/current at the output of the rectifier instead of directly at the secondary coil. It may be applied to determine the strength of the received power signal, or to determine the received power. The demodulator 23 translates changes of the sensed signal into data. The controller 20 controls the modulator 25 to communicate data and interprets the data received by the demodulator as described in detail below.

FIG. 3 shows a flowchart for the communication in an inductive power system. The system may comprise a power transmitter as described above with reference to FIG. 1, and a power receiver as described above with reference to FIG. 2. The communication at the power transmitter (TRM) is shown on the left side of the Figure, and the communication at the power receiver (REC) is shown on the right side of the Figure.

At start 31 the power transmitter provides a power signal (PS) to the power receiver. The power receiver receives the power signal at start 36, which power signal activates the power receiver and which may be used by the power receiver to power up its electronics. The power receiver is triggered to start communicating and transmits data to the power transmitter in step Transmit Data 37, as indicated by arrow RT. This data signal is provided according to a first communication state/mode, e.g. a predefined mode defined in a standard. The power transmitter receives first data and second data from the power receiver in step Receive Data 32. The step 32 of Receive Data comprises receiving a reflected signal by the transmitter coil from the power receiver, sensing the amplitude or phase of the current/voltage on the primary coil, and demodulating the sensed signal, e.g. by converting changes in amplitude or phase into data, e.g. the first data and second data. The first data indicates a modulation requirement, said second data indicates an inquiry message.

The power receiver may indicate, in the second data indicating the inquiry message, a specific response from the power transmitter. In step Require Data Response 38, it is determined whether such a response is required. If not, the power receiver proceeds to the end of the communication cycle. In that case, the power transmitter does not transmit data to the power receiver. If yes, i.e. if the power receiver requires a data response from the power transmitter, it indicates this in the second data in the signal RT. In this case this is detected in step Require Data Response 33, and the power transmitter responds in step Transmit Data 34 by transmitting data as required by the power receiver as indicated in the Figure by arrow TR. The response is transmitted in Transmit Data step 34 according to a second communication state/mode; The Transmit Data step 34 comprises generating a response message, intended for responding to the inquiry message, and modulating the power signal according to said modulation requirement so as to transmit the response message carried by the modulated power signal via the transmitter coil to the power receiver.

If the power transmitter does not respond as required, the power receiver detects a time-out in step 39 and proceeds to resending the data in step 37. If the power transmitter responds as required, i.e. within the response time, to the power receiver, then the power receiver receives, in Receive Data Step 35, the response message from the transmitter by demodulating the power signal received by the receiver coil according to the demodulation requirement.

Then, the power receiver proceeds to the end of the communication cycle. At the end of a communication cycle, the power receiver may start a new communication cycle, starting with step Power receiver Transmit Data 37.

FIG. 4 shows a data message. The Figure shows a format of a packet that the power receiver communicates to the power transmitter. The format may be predefined in a standard. The message has a preamble (PRE), a header (HDR), a message content (MES) and a checksum (CHK) for detecting errors.

A similar format may be used for a packet that the power transmitter communicates to the power receiver, which format may be indicated in the inquiry message as described below in detail.

It is noted that the modulation requirement as indicated by said first data may correspond to various types of modulation. The types of modulation are known per se, e.g. amplitude modulation, frequency modulation, phase modulation, or any other type of modulation of the power signal. Furthermore, the modulation requirement may indicate a modulation range for a certain type of modulation, e.g. modulation depth for amplitude modulation of the power signal, and/or a frequency shift for frequency modulation of the power signal, and/or a phase shift for phase modulation of the power signal. The required response as transferred by said second data may indicate a format of said response message. Also, the receiver may control the communication cycle. It starts the cycle with an inquiry. The transmitter has to react to the inquiry within a certain time, otherwise the receiver has to assume that something went wrong and terminates the communication cycle in order to retry. So, the time duration from the inquiry to the response has to be limited.

The time requirement indicated by the second data could be the response time requirement, such as, for example, a time duration of the whole cycle starting from the transmitting of an inquiry message by the power receiver to the receiving of the response message by the power receiver, or the time duration for the power transmitter to react to the inquiry message starting from the power transmitter receiving the last bit of the inquiry message to the power transmitter transmitting the first bit of the response message, or the like.

The time requirement could also be the requirement regarding the speed of transmitting data or bits, i.e. the speed of communication. It is also referred to as "bit rate" and determines the required time to transmit a bit or the bit duration. Indicating the bit rate or bit duration by the power receiver helps reduce the implementation cost of the power receiver. The longer the bit duration, the easier the bit can be detected by the power receiver; the shorter the bit duration, the faster the response message can be communicated.

The modulation unit and the driver in the power transmitter are arranged for transmitting said response message according to the modulation requirement as indicated in the first data, and, where applicable, with said format and within said time requirement(s).

In an embodiment, said first data and second data are included in a single data packet. Alternatively, said first data and second data are included in two or more separate data packets. Multiple data packets may be transmitted to transfer a multitude of second data from the power receiver to the power transmitter.

The following table shows some examples of inquiry packets that the power receiver can communicate to the power transmitter, indicating the required response of the power transmitter. The Header Code determines the Packet Type and indicates the response that the power transmitter has to provide; the Message indicates the modulation requirement for transmitting said response.

| Header Code | Packet Type | Message |
| --- | --- | --- |
| 0x07 | Go into test mode? | Required amplitude change for "yes" |
| 0x08 | Go into calibration mode? | Required amplitude change for "yes" |
| 0x20 | Physical mode | Amplitude/frequency/phase |
| 0x21 | Give a command | Required modulation depth |
| 0x22 | Give available power status | Required modulation depth |

The first two examples (Header Code 0x07 and 0x08) require a "yes" "no" answer from the power transmitter. The message field indicates the required amplitude change in case the power transmitter responds with "yes". The value in the message field can be coded as relative required change in respect to the actual power signal amplitude (as well as the message field of the control error in the current Qi specification). The third example (Header Code 0x20) indicates in which physical mode the power receiver requires the power transmitter to modulate the power signal. The default mode could be amplitude modulation. With this packet the power receiver could change the mode to e.g. frequency or phase modulation. This packet could be communicated in the configuration phase. The fourth and fifth examples (Header Code 0x21 and 0x22) indicate that the power receiver expects the power transmitter to respond by transmitting a packet. The message field of these examples indicates the modulation range. The value in the message field can be coded as relative required change in respect to the actual power signal amplitude/frequency/phase. The packet format that the power transmitter applies could have a format as shown in FIG. 4.

In an embodiment, the communication as defined above is applied as follows. To test a power receiver under its operating conditions, the power receiver must be put in these various conditions. Some of these conditions are determined by external factors like the environmental temperature, or the positioning of the power receiver towards the power transmitter. These conditions can be arranged during the testing procedure. Other conditions like, for example, the output load of the power receiver can change from high to low impedance and the required power can change from low to high. Without bi-directional communication, such conditions might be hard to realize in a compliance test and may also require a long measurement time. To solve this problem, the power receiver device could be set to operate in a test mode in which it simply sweeps through these operation conditions. By providing the communication as defined below, a manufacturer does not need to provide the device with additional hardware, contacts, push buttons, etc.

Similar problems may occur for other applications that would require communication from power transmitter to power receiver, e.g. like a request to a power receiver to go into calibration mode. More in general, communication from power transmitter to power receiver is useful, e.g. to provide a command to the power receiver, for example to go into a certain mode, or to provide information on a status of the power transmitter. A configurable communication channel from power transmitter to power receiver is provided to solve this problem.

The method of communicating in the inductive power transfer system is as follows. The system comprises a power receiver and a power transmitter as described above. The method comprises the step of transmitting, by the power receiver, first data and second data to the power transmitter, the first data indicating a modulation requirement, the second data indicating an inquiry message. The power transmitter generates a response message modulated on a power signal according to said modulation requirement, the response message being intended for responding to the inquiry message. Hence, the modulation that is applied by the power transmitter is set according to the modulation requirement as sent by the power receiver. Subsequently, the power receiver will receive the power signal via the receiver coil from the transmitter coil, and will demodulate the power signal according to the modulation requirement for receiving a response message which is intended for responding to the inquiry message.

In an embodiment, a simple protocol is provided that enables a test power transmitter to set a power receiver into test mode. The power receiver asks the power transmitter, via the inquiry message in a dedicated packet, if it wants the power receiver to go into test mode. The packet includes the desired (change of) power signal that the power receiver can detect. In response to this packet, the power transmitter provides a power signal according to, or not according to, the power receiver's desire, indicating to the power receiver to go into test mode.

More in general, the invention enables communication from power transmitter to power receiver, wherein the power receiver controls how the power transmitter has to respond. Because the required response is under the control of the power receiver, there is freedom as to the implementation on the power receiver and, in addition, at low hardware implementation cost. The power receiver for example determines the required amplitude modulation depth. The designer can determine which modulation depth is required under which circumstances in order to easily demodulate. The power receiver can re-use its existing hardware, e.g. it can re-use the hardware for measuring the signal strength for this purpose.

In an embodiment, before power transfer, the power receiver communicates configuration packets to the power transmitter, which are intended to prepare the power transmitter for the power transfer. In this phase, the power receiver has normally no control over the power transmitter regarding the power signal. The power transmitter keeps the signal constant. Subsequently, during power transfer, the power receiver communicates control packets to the power transmitter in order to control the power transmitter to adapt the power signal according to the desire of the power receiver. If the power receiver communicates a control packet during the configuration phase, indicating a desired change in the power signal that is detectable by the power receiver, it gets a special meaning, because during the configuration phase the power signal is kept constant, e.g. the special meaning could be to detect whether the power transmitter wants the power receiver to go into test mode.

The power transmitter changes or does not change the power signal in the configuration phase to indicate whether or not the power receiver should go into test mode. This can be regarded as a 1 bit communication from power transmitter to power receiver. This change can in principle be a change in amplitude, frequency, or phase. The change can be made once, or multiple times. The change can be synchronized with the communication of configuration packets, e.g. directly after the reception of a certain packet.

In order to minimize the requirements on the power receiver to be able to detect such a change of signal, the required signal change, for communicating such a bit, is under the control of the power receiver. The content of the control error packet determines the required signal change. The designer of the power receiver can choose which signal the power receiver has to measure in order to detect the signal change.

Both power transmitter and power receiver can apply exactly the same mechanism as for controlling the power signal in the power transfer phase. The power receiver applies a signal that it measures and that is relevant for control anyhow. It does not require any additional hardware for the power receiver and hardly any software. The only change for the power receiver is to communicate a control packet to which the power transmitter may respond by changing the power signal and then to check for the expected change of the power signal.

In an embodiment, if the power transmitter desires that the power receiver goes into test mode, the power transmitter does not change the power signal; otherwise it changes the signal according to the control packet. The power receiver goes into test mode if the signal does not change according to the control packet.

In an alternative embodiment, if the power transmitter desires that the power receiver goes into test mode, the power transmitter changes the power signal according to the control signal; otherwise it does not change the power signal. The power receiver goes into test mode if the signal changes according to the control packet. Advantageously, if the control packet does not arrive, the power transmitter does not change the power signal. This results in the power receiver not going into test mode by default.

In a further alternative embodiment, if the power transmitter desires that the power receiver goes into test mode, the power transmitter changes the power signal according to the control signal and then back to the original signal; otherwise it does not change the power signal. The power receiver goes into test mode if the signal changes according to the control packet. Advantageously, the power signal is only briefly changed to another value.

In an embodiment, the power receiver communicates a dedicated packet to the power transmitter, to which the power transmitter has to respond. The packet includes said inquiry message which indicates how the power transmitter has to respond. The power receiver can apply this packet in any phase (for example the configuration or power transfer phase according to the Qi wireless power specification). If the power transmitter does not respond, the power receiver regards this as an error and might resend the dedicated packet for another try.

On logic level, the dedicated packet may indicate what type of content it expects from the power transmitter. The power receiver could request a yes/no answer to a question, for example if the power receiver has to go into test mode. Alternatively, the power receiver could request a command, for example it can request a command that indicates into which mode the power receiver has to go. The power receiver could also request status information from the power transmitter, for example what amount of power the power transmitter is able to deliver.

On coding level, the dedicated packet indicates what coding it expects from the power transmitter. This could be a single bit in case a yes/no answer is expected, or a complete packet in case an instruction, or status indication is expected. An existing coding technique can be applied for bit, byte and packet coding. For example, a bi-phase coding can be applied for bits; bytes can be coded as 8 bit data, start bit, stop bit and parity bit; packets can be coded by a preamble, content, and error check, as shown in FIG. 4. Further information on possible coding techniques can be found in chapter 6.2.2, 6.2.3 and 6.2.4 of part 1 of the Qi wireless power specification, which describes a predetermined coding technique used for transmitting data from the power receiver to the power transmitter.

On a physical level, the dedicated packet may indicate what kind of modulation it expects. The power receiver indicates the required amplitude, frequency, or phase modulation that the power transmitter has to perform on its power signal. For example, the required amplitude modulation is indicated similarly as for the control error packet. The power transmitter should change its power signal between two levels. The change between the two levels is indicated by the content of the dedicated packet. The first level could be equal to the actual power level, which is the power level just before the power receiver communicates its dedicated packet. So, the first change corresponds to a case where the power receiver has requested a change of the power level from the actual level to the new level, like with a control error packet in the power transfer phase. The power transmitter changes the signal forward and back between the actual level and the new level for communicating the bits. Both levels could be different from the actual power level. For example, the first level could be higher and the second level could be lower than the actual power level. The average of the two levels could be equal to the actual power level.

It is to be noted that the invention may be implemented in hardware and/or software, using programmable components. It will be appreciated that, for clarity, the above description relates to embodiments of the invention with reference to different components, functional units and processors. However, it will be apparent that any suitable distribution of functionality between different functional units or processors may be used without deviating from the invention. For example, functionality illustrated as being performed by separate units, processors or controllers may be performed by the same processor or controller. Hence, references to specific functional units are only to be seen as references to suitable means for providing the described functionality, rather than being indicative of a strict logical or physical structure or organization.

Although the present invention has been described in connection with some embodiments, it is not intended to be limited to the specific form set forth herein. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, units or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims does not imply any specific order in which the features must be worked and in particular the order of individual steps in a method claim does not imply that the steps must be performed in this order. Rather, the steps may be performed in any suitable order. In addition, singular references do not exclude a plurality. Thus, references to "a", "an", "first", "second" etc. do not preclude a plurality. Reference signs in the claims are provided merely as a clarifying example and shall not be construed as limiting the scope of the claims in any way.

The invention claimed is:

1. A power transmitter for transmitting power inductively to a power receiver via a transmitter coil, the power transmitter comprising:
a sensing and demodulating controller circuit configured to receive first data and second data from the power receiver via the transmitter coil, said first data indicating a modulation requirement, and said second data including an inquiry message that indicates whether a response message is required from the power transmitter, wherein the power receiver terminates communication when the power transmitter does not respond within a predetermined time period if the response message is required; and
a modulating and transmitting controller circuit configured to transmit the response message to the power receiver via the transmitter coil when the response message is required according to the second data, said modulating and transmitting controller circuit configured to generate a modulated power signal utilizing the modulation requirement to communicate the response message via the modulated power signal.

2. The power transmitter as claimed in claim 1, wherein said modulation requirement is indicative of a demodulation capability of the power receiver.

3. The power transmitter as claimed in claim 1, wherein the modulation requirement includes at least one of a format and a time requirement, and wherein the power transmitter is configured to transmit said response message according to at least one of the format and the time requirement.

4. The power transmitter as claimed in claim 1, wherein the modulation requirement corresponds to at least one of
a type of modulation of the power signal, or
a modulation range for a certain type of modulation.

5. The power transmitter as claimed in claim 4, wherein the type of modulation of the power signal is selected from
amplitude modulation,
frequency modulation, or
phase modulation, and wherein the modulation range is at least one of a modulation depth for amplitude modulation of the power signal, a frequency shift for frequency modulation of the power signal, or a phase shift for phase modulation of the power signal.

6. The power transmitter as claimed in claim 1, wherein said first data and second data are in a single data packet or in two separate data packets.

7. A power receiver for receiving a modulated power signal inductively from a power transmitter via a receiver coil, the power receiver comprising:
a modulating and transmitting controller circuit configured to send a reflected signal comprising first data and second data to the power transmitter via the receiver coil, the first data indicating a modulation requirement, and the second data including an inquiry message that indicates whether a response message is required from the power transmitter, wherein the power receiver terminates communication when the power transmitter does not respond within a predetermined time period if the response message is required; and
a sensing and demodulating controller circuit configured to receive the response message from the power transmitter via the receiver coil when the response message is required according to the second data, wherein the response message is communicated via the modulated power signal based on the modulation requirement, and wherein said sensing and demodulating controller circuit is further configured to demodulate the modulated power signal received by the receiver coil according to the modulation requirement to receive the response message.

8. The power receiver as claimed in claim 7, wherein said modulation requirement is indicative of a demodulation capability of the power receiver.

9. The power receiver as claimed in claim 7, wherein the power receiver is configured to demodulate said response message according to the modulation requirement.

10. The power receiver as claimed in claim 7, wherein the modulation requirement corresponds to at least one of the following
a type of modulation of the power signal, or
a modulation range for a certain type of modulation.

11. The power receiver as claimed in claim 7, wherein a type of modulation of the power signal is selected from the following
amplitude modulation,
frequency modulation, or
phase modulation, and wherein a modulation range is at least one of a modulation depth for amplitude modulation of the power signal, a frequency shift for frequency modulation of the power signal, or a phase shift for phase modulation of the power signal.

12. The power receiver as claimed in claim 7, wherein said first data and second data are sent via a single data packet or via two separate data packets.

* * * * *